(12) United States Patent
Hicham et al.

(10) Patent No.: US 10,058,896 B2
(45) Date of Patent: Aug. 28, 2018

(54) INSTALLATION FOR SEPARATING AND SINGULATING NON-UNIFORM POSTAL ARTICLES WITH A VISION SYSTEM HAVING LASER SOURCES

(71) Applicant: Solystic, Bagneux (FR)

(72) Inventors: El Bernouss Hicham, Paris (FR); Karine Crest, Etoile sur Rhône (FR); Agnès Philppe, Vincennes (FR)

(73) Assignee: SOLYSTIC, Bagneux (FR)

(*) Notice: Subject to any disclaimer, the term of this patent is extended or adjusted under 35 U.S.C. 154(b) by 0 days.

(21) Appl. No.: 15/030,666

(22) PCT Filed: Jan. 26, 2016

(86) PCT No.: PCT/FR2016/050149
§ 371 (c)(1),
(2) Date: Oct. 17, 2017

(87) PCT Pub. No.: WO2016/128637
PCT Pub. Date: Aug. 18, 2016

(65) Prior Publication Data
US 2018/0056333 A1    Mar. 1, 2018

(30) Foreign Application Priority Data

Feb. 11, 2015   (FR) ..................... 15 51123

(51) Int. Cl.
| | |
|---|---|
| *B07C 1/04* | (2006.01) |
| *B07C 3/08* | (2006.01) |
| *B65G 47/14* | (2006.01) |
| *G06T 7/521* | (2017.01) |
| *B25J 15/06* | (2006.01) |
| *B25J 9/16* | (2006.01) |

(52) U.S. Cl.
CPC .................. *B07C 1/04* (2013.01); *B07C 3/08* (2013.01); *B25J 9/1697* (2013.01);
(Continued)

(58) Field of Classification Search
CPC .. B07C 1/04; B07C 1/06; B25J 9/1697; B25J 15/0616; B65G 47/14; B65G 47/1485;
(Continued)

(56) References Cited

U.S. PATENT DOCUMENTS 4,929,843 A * 5/1990 Chmielewski, Jr. .......................
G01B 11/024
250/223 R
7,161,688 B1    1/2007 Bonner et al.
(Continued)

FOREIGN PATENT DOCUMENTS

DE        102007038834        2/2009

OTHER PUBLICATIONS

French Search Report dated Dec. 10, 2015, for Application No. 1561121.

*Primary Examiner* — Joseph C Rodriguez
(74) *Attorney, Agent, or Firm* — Patterson & Sheridan, LLP

(57) ABSTRACT

An installation for separating and singulating non-uniform postal articles of the small parcel or packet type is characterized in that it comprises a platform for storing a pile of loosely placed postal articles, a vision system adapted to form digital images of the pile of loose postal articles, which pile is static on the platform, and a pneumatic pickup head of a robotized arm. The vision system comprises at least one laser source that projects a beam of fanned-out laser lines onto the pile of articles, thereby making it possible, on the basis of images including the laser lines on the pile of articles, to compute accurately a map of depths, and to perform digital silhouetting so as to singulate an article from the pile of loose articles.

5 Claims, 3 Drawing Sheets

(52) U.S. Cl.
CPC ....... *B25J 15/0616* (2013.01); *B65G 47/1485* (2013.01); *B65G 2203/0225* (2013.01); *G06T 7/521* (2017.01)

(58) Field of Classification Search
CPC .......... B65G 47/917; B65G 2203/0225; B65G 2203/0233; B65G 2203/04; G06T 7/50; G06T 7/521; G01B 11/25; G01B 11/2513
See application file for complete search history.

(56) References Cited

U.S. PATENT DOCUMENTS

| | | | |
|---|---|---|---|
| 7,313,464 B1 * | 12/2007 | Perreault | B25J 9/1666 318/568.1 |
| 9,156,162 B2 * | 10/2015 | Suzuki | B25J 9/16 |
| 9,333,649 B1 * | 5/2016 | Bradski | B25J 9/163 |
| 9,470,515 B2 * | 10/2016 | Oumi | H04N 5/2256 |
| 9,676,003 B2 * | 6/2017 | Kara | B65G 47/967 |
| 2009/0040532 A1 * | 2/2009 | Kawasaki | G01L 311/2513 356/610 |
| 2013/0006423 A1 * | 1/2013 | Ito | B25J 9/1612 700/259 |
| 2013/0151007 A1 * | 6/2013 | Valpola | B25J 9/1694 700/245 |
| 2014/0079524 A1 * | 3/2014 | Shimono | B25J 9/1669 414/796.9 |
| 2016/0199884 A1 * | 7/2016 | Lykkegaard | B07C 5/02 700/223 |
| 2017/0165717 A1 * | 6/2017 | Crest | B07C 1/04 |
| 2017/0225330 A1 * | 8/2017 | Wagner | B25J 9/1664 |

* cited by examiner

INSTALLATION FOR SEPARATING AND SINGULATING NON-UNIFORM POSTAL ARTICLES WITH A VISION SYSTEM HAVING LASER SOURCES

TECHNICAL FIELD

The present invention relates to an installation for separating and singulating postal articles of the small parcel or packet type.

The installation of the invention is, in particular, designed to be used to feed an automatic postal sorting machine in which the singulated parcels or packets are moved in series and at constant pitch past sorting outlets of the machine, and each of them is directed towards a suitable sorting outlet as a function of the delivery address on the parcel or packet.

PRIOR ART

Solutions for separating and singulating articles are known in which articles loaded loosely into a feeder or hopper are poured continuously onto belts, rollers, and other types of mechanical conveyor, and are spread out into single units as they move along said conveyors. The spread-out articles can then be taken one-by-one so as to be put in series on a belt conveyor, for example. That type of spreading-out installation suffers from the drawback of being voluminous.

In the postal field, small parcels or packets are articles that are essentially non-uniform, namely articles that are of a wide variety of dimensions and shapes, and it is important to put them in series at a constant pitch, i.e. with a constant distance between the leading edges of any two consecutive articles, so that each article can be directed automatically and easily towards a respective sorting outlet of a sorting machine.

SUMMARY OF THE INVENTION

An object of the invention is thus to propose an installation for separating and singulating non-uniform postal articles of the small parcel or packet type that is compact, and that makes it possible to put the articles in series at a constant pitch at the inlet of a postal sorting machine.

To this end, the invention provides an installation for separating and singulating non-uniform postal articles of the small parcel or packet type, said installation being characterized in that it comprises:

a platform for storing a pile of loosely placed postal articles;

a vision system adapted to form digital images of the pile of loose postal articles;

a data processor unit adapted to identify a postal article to be singulated that has a non-covered pickup face, on the basis of said digital images; and a pneumatic pickup head of a robotized arm that is controlled to take said postal article to be singulated via its pickup face, and to deposit said postal article on a deposition zone that is off the platform;

in that said vision system includes at least one laser source that projects fanned-out laser lines onto the pile of postal articles; and in that the data processor unit is adapted to identify the postal article to be singulated on the basis of an image of the pile of postal articles that includes said laser lines, and on the basis of a contrast image of the pile of postal articles.

In this installation, the pile of postal articles is static on the platform and the postal articles are separated one-by-one by the robotized arm down to the last one in the pile of loosely placed articles on the platform. A new pile of loose postal articles is then formed on the platform and the postal articles in the new pile of postal articles are separated one-by-one as described above. Every time a postal article is taken from the pile of postal articles, the vision system forms an image of the pile of postal articles remaining on the platform in such a manner as to determine a new postal article to be taken from the pile of postal articles.

The digital images of the pile of articles including the laser lines and the contrast digital images of the pile of articles enable the data processor unit to compute a map of depths that makes it possible to obtain the three-dimensional (3D) coordinates of the pickup face of the article to be singulated, and in particular the height of its center of gravity.

The robotized arm can deposit each postal article taken from the pile on a belt conveyor moving at a predetermined constant speed, the robotized arm being synchronized with said belt conveyor so that the articles are placed in series on the belt of the conveyor at a constant pitch.

The installation of the invention may also have the following features:

said vision system may include two laser sources that project onto the pile of postal articles respectively a beam of first fanned-out laser lines, and a beam of second fanned-out laser lines that intersect the first laser lines; the first and second laser lines then form a grid projected onto the pile of postal articles, thereby enabling the data processor unit to determine the map of depths easily, using a triangulation principle; and said vision system includes a first laser source that projects onto the pile of postal articles a beam of first fanned-out laser lines, and a second laser source that projects onto the pile of postal articles a beam of second fanned-out laser lines that intersect the first laser lines, said vision system further including a third laser source that projects onto the pile of postal articles a beam of third fanned-out laser lines, and a fourth laser source that projects onto the pile of postal articles a beam of fourth fanned-out laser lines that intersect the third laser lines, the angular spacing between the first laser lines being different from the angular spacing between the third laser lines, and the angular spacing between the second laser lines being different from the angular spacing between the fourth laser lines, and the vision system is adapted to form a first digital image of the pile of postal articles that includes the first and second laser lines, and to form a second digital image of the pile of postal articles that includes the third and fourth laser lines, and to form a contrast third digital image of the pile of postal articles, and the data processor unit is adapted to identify the postal article to be singulated on the basis of said first and second images of the pile of postal articles that include said laser lines, and on the basis of the contrast image.

With these different angular spacings, the data processor unit can initialize the map of depths and the digital silhouetting of the articles with a grid having lower resolution, and can impart finer accuracy to the results with the higher-resolution grid.

Advantageously, the first and third laser sources and the second and fourth laser sources are placed mutually facing one another so as to avoid the effect of the cast shadows.

In a particular embodiment of the invention, the laser sources project laser lines respectively and at the same time, but with different colors, and, by color filtering, the laser lines of one color are separated from the laser lines of another color in the images.

The vision system may be arranged to switch off, in alternation, two of the four laser sources while it is taking an image of the pile of articles that includes the grid of laser lines projected by the other two laser sources.

The first and second laser sources may be arranged to project onto the pile of postal articles a grid of 25×25 laser lines, and the third and fourth laser sources may be arranged to project onto the pile of articles a grid of 63×63 laser lines.

The invention also provides a postal sorting machine that includes an installation as defined above upstream from a sorting bin conveyor in which the small packets or parcels are moved past sorting receptacles.

BRIEF DESCRIPTION OF THE DRAWINGS

The invention is described below in more detail and is shown by the drawings that show an example of an installation of the invention for separating and singulating small postal parcels or packets. In the drawings.

DESCRIPTION OF EMBODIMENTS

Figure 1:
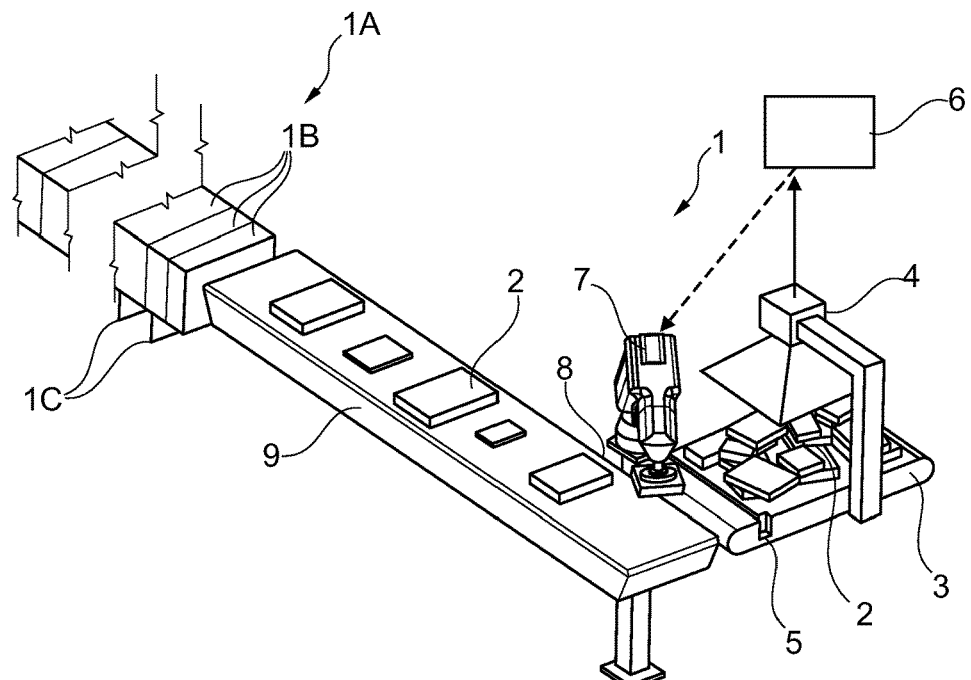
FIG. 1 is a diagrammatic view of the installation of the invention having a robotized arm that comes to separate and to singulate postal articles in a pile on a platform.

In FIG. 1 of the drawings, the installation 1 of the invention is very suitable for feeding small parcels or packets 2 to an automatic postal sorting machine in which the parcels or packets 2 are moved in series at constant pitch, e.g. by means of a bin conveyor 1A with bins 1B having their bottoms closed by flaps.

Sorting outlets 1C, e.g. in the form of trays, are disposed under and along the bin conveyor.

Each sorting outlet corresponds to a certain postal delivery destination. As a function of the delivery address that has been read on each singulated parcel or packet, said parcel or packet is unloaded from a bin towards the corresponding sorting outlet by automatically opening the flap in the bottom of the bin when the bin is vertically above said sorting outlet.

In this example, the installation of the invention for separating and singulating postal articles includes a platform for storing a pile of loosely placed postal articles.

In this example, the platform is constituted by a belt conveyor 3 that is adapted to be loaded upstream with a pile of postal articles and to bring said pile of postal articles under a vision system 4.

Once the pile of postal articles is under the vision system 4, as can be detected by an optical sensor 5, the belt conveyor 3 is stopped and thus the vision system 4 observes a pile of postal articles that is static.

The vision system is designed to form digital images of this static pile of postal articles that is observed from above.

Image processing is performed on the digital images in a data-processing unit 6 that is also a monitoring and control unit for the robotized arm 7.

The unit 6 is programmed to identify an article to be singulated from the pile of loosely placed particles. Said article to be singulated is the one that has a pickup face (generally a plane rectangular face) that is not covered by any other article in the pile of articles and that is preferably facing in the direction going towards the top of the pile of articles. Said article to be singulated may, for example, be the article that is situated at the top of the pile of articles.

The unit 6 is programmed to act, by scene analysis, to compute various items of data indicative of the three-dimensional position of said pickup face (3D position of the center of gravity of said pickup face) relative to the platform 3, the facing direction of said pickup face, and the two dimensions (length and width) of said pickup face.

Based on that data, the unit 6 controls the robotized arm 7, which is provided with a pneumatic pickup head 8, so that it picks up the article to be singulated via the pickup face and puts it down at a deposition point off the platform, which point is a predetermined location at the end of a flat conveyor 9 in this example.

Figure 3:
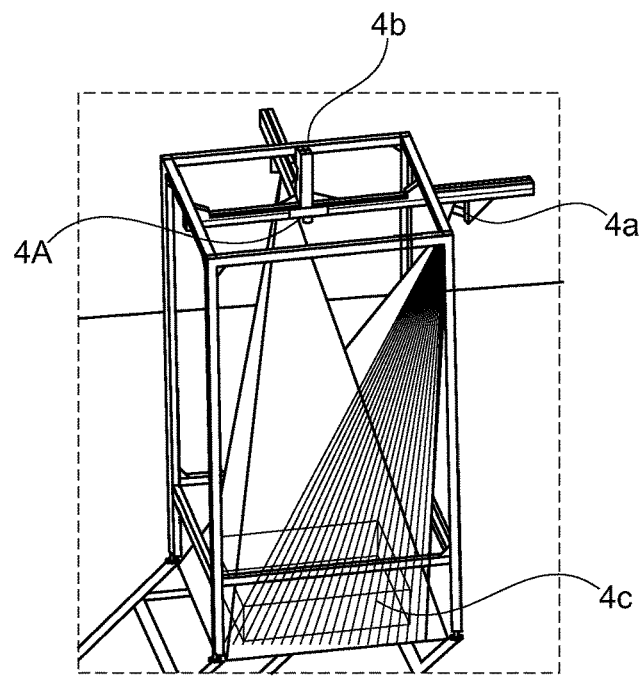
FIG. 3 shows the vision system including the camera and the laser sources that generate a grid over the pile of loose postal articles.

FIG. 3 is a very diagrammatic view of the vision system of the invention that, in this example and in addition to the camera 4A, which may be a grayscale camera or a color camera, includes two laser sources 4a, 4b mounted on a frame above the platform 3, each of which sources projects a beam of fanned-out laser lines onto the pile of articles. The laser lines slant relative to the axis of the camera, and each line illuminates the postal articles at a certain angle of incidence.

More particularly, the dimensions of the scene 4c observed by the camera of the vision system 4 may have a horizontal area of 600 millimeters (mm)×600 mm and a height of 150 mm, and the camera with the laser sources 4a, 4b may be mounted 1.5 m above the scene to be observed.

The angle of incidence of the laser lines may vary from 7.2° to 33.8°, in steps of 1.15°. In this example, since the two laser sources 4a, 4b are offset by 90°, they co-operate to project a grid pattern onto the surfaces of the postal articles. For example, the laser sources 4a, 4b can project a low-resolution grid of 25×25 laser lines. In accordance with the invention, another pair of laser sources may be provided to project a high-resolution other grid of 63×63 laser lines.

Figure 4:
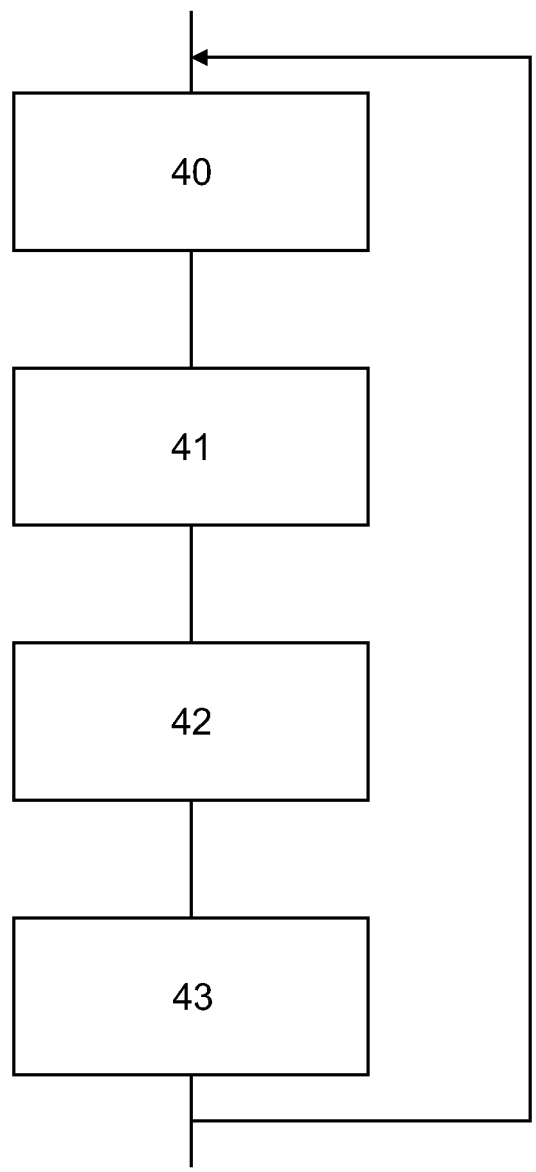
FIG. 4 shows the image acquisition and processing process of the invention.

In practice, as shown in FIG. 4, and in a preferred embodiment of the invention, for each stage of identification of a postal article to be taken from the pile of postal articles placed on the platform 3, the vision system 4 is controlled to form, at 40, a contrast first digital image not having any laser lines. This first digital image is stored in a memory in the processor unit 6.

Figure 5:
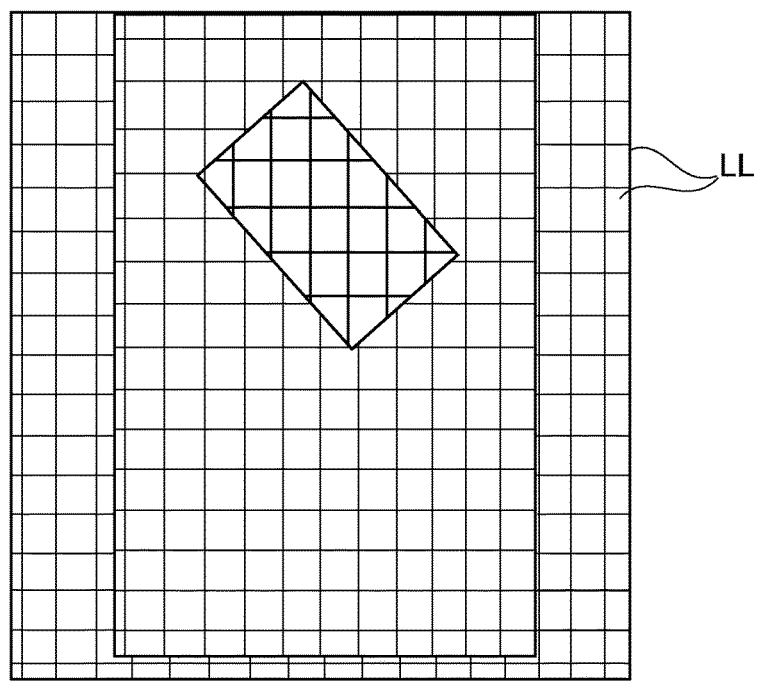
FIG. 5 shows an unprocessed image produced by the vision system with a low-resolution grid.

A second digital image of the pile of postal articles covered with the low-resolution grid of 25×25 laser lines is formed at 41 by the vision system 4, and is stored in a memory in the processor unit 6. An example of a digital image with a grid of laser lines LL is shown in FIG. 5.

A third digital image of the pile of postal articles covered with the high-resolution grid of 63×63 laser lines, is formed at 4 by the vision system 4, and is stored in a memory in the processor unit 6.

On the basis of the these three digital images of the scene observed by the vision system 4, the unit 6 is suitable for performing, at 43, digital silhouetting on the non-covered pickup face of the postal article to be taken, and for accurately evaluating its three-dimensional position by computing a map of depths.

The term "digital silhouetting" is used to mean the function that defines each postal article in a plane (x, y), and the term "map of depths" is used to mean a map that gives a height (z) for each point of said plane.

The principle whereby the map of depths is constructed in the unit 6 is based on the fact that, in the absence of an article on the platform 3, the laser lines occupy reference positions. Since said laser lines are projected at angles of incidence varying from 7.2° to 33.8° in steps of 1.15°, they are shifted (broken) in the presence of articles in the scene to be analyzed (this shifting can be seen in FIG. 5). Said shifting is proportional to the height of the article under analysis. Said shifting is measured by the vision system 4, the resolution of which depends on the observation height. Since the observation height above the scene is not known in advance, it is possible to construct a reference chart making it possible to compute the height as a function of the shift observed for each of the laser lines.

In the image-processing step 43, it is possible, for example, to correct geometric distortions in the optical system of the camera of the vision system 4 in each digital image. The contrast image is subjected to outline extraction and the images with the laser lines are binarized, filtered, convolved with directional (horizontal and vertical) cores so that the rows and columns of the grid are filtered successively, and intersected so as to use connexity analysis and outline dilation to digitally silhouette the pickup face of the article to be taken in the contrast image. A 3D Hough transform may be applied to the convolved digital images to reconstruct the map of depths.

Figure 2:
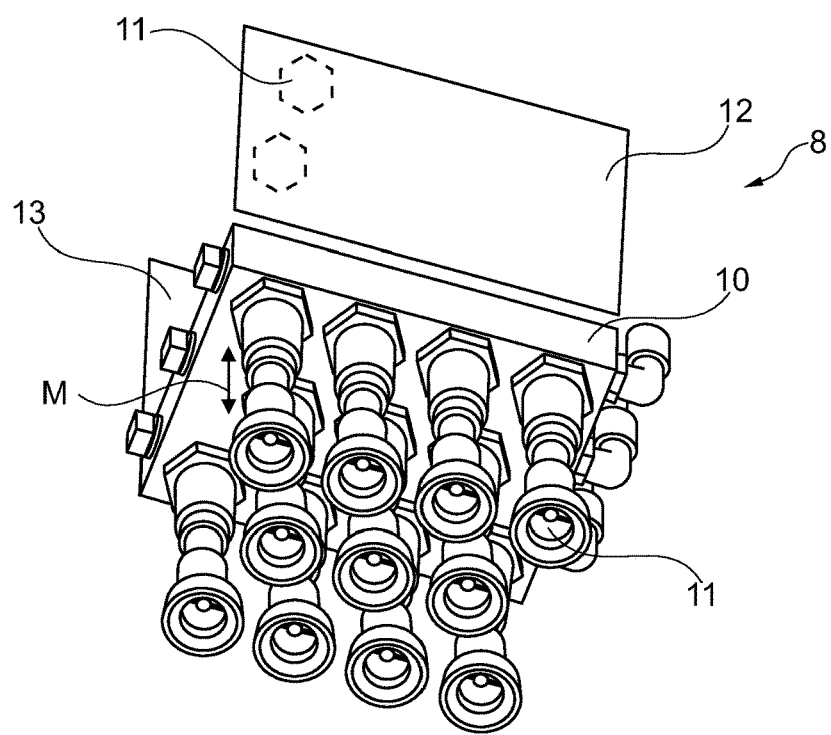
FIG. 2 is a very diagrammatic view of the pickup head of the robotized arm.

In accordance with the invention, the pneumatic pickup head 8 is of variable geometry, i.e. has a pickup area that is variable. In particular, in FIG. 2, the pickup head has a main plate 10 provided with a plurality of suction cups 11. Said suction cups 11 may be mounted to be individually movable transversely to the plane of the plate 10, as indicated by arrow M in order to adapt to a non-plane profile of the pickup face of the article to be singulated.

At least two hinged flaps (shown symbolically at 12 and 13), each of which is equipped with a plurality of suction cups, such as 11, may be provided on two opposite sides of the main plate 10 so that the pickup area of the head can be servo-controlled to the dimensions of the pickup face of the article to be singulated by extending or by raising each flap individually, thereby improving the picking up of the article to be singulated. More particularly, the article to be singulated may be picked up by using the main plate 11 of the pickup head, or by using the main plate 11 and one flap 12 as extended (with the other flap being raised), or indeed by using the main plate 11 and both flaps 12, 13 as extended.

On the basis of the data indicating the facing direction and the dimensions of the pickup face, the unit 6 is suitable for taking hold of the article to be singulated while angularly positioning the main plate along the long length of the pickup face of said article, and for depositing said article while angularly positioning the long length of its pickup face along the longitudinal axis of the flat conveyor 9.

In addition, the unit 6 is suitable for positioning the center of gravity of the main plate 10 of the pickup head to coincide with the center of gravity of the pickup face of the article to be singulated and to have said article deposited by the robotized arm on a synchronization reference on the flat conveyor 9 so as to maintain a constant pitch between two consecutive articles on said flat conveyor.

The invention claimed is:

1. An installation for separating and singulating non-uniform postal articles of the small parcel or packet type comprising:

a platform for storing a pile of loosely placed postal articles;

a vision system adapted to form digital images of the pile of loose postal articles;

a data processor unit adapted to identify a postal article to be singulated that has a non-covered pickup face, on the basis of said digital images; and a pneumatic pickup head of a robotized arm that is controlled to take said postal article to be singulated via said non-covered pickup face, and to deposit said postal article on a deposition zone that is off the platform;

said vision system including at least one laser source that projects fanned-out laser lines onto the pile of postal articles; and the data processor unit being adapted to identify the postal article to be singulated on the basis of an image of the pile of postal articles that includes said laser lines, and on the basis of a contrast image of the pile of postal articles, wherein said vision system includes a first laser source that projects onto the pile of postal articles a beam of first fanned-out laser lines, and a second laser source that projects onto the pile of postal articles a beam of second fanned-out laser lines that intersect the first laser lines, said vision system further including a third laser source that projects onto the pile of postal articles a beam of third fanned-out laser lines, and a fourth laser source that projects onto the pile of postal articles a beam of fourth fanned-out laser lines that intersect the third laser lines, the angular spacing between the first laser lines being different from the angular spacing between the third laser lines, and the angular spacing between the second laser lines being different from the angular spacing between the fourth laser lines, and in that the vision system is adapted to form a first digital image of the pile of postal articles that includes the first and second laser lines, and to form a second digital image of the pile of postal articles that includes the third and fourth laser lines, and to form a contrast third digital image of the pile of postal articles, and in that the data processor unit is adapted to identify the postal article to be singulated on the basis of said first and second images of the pile of postal articles that include said laser lines, and on the basis of the contrast third image of the pile of postal articles.

2. The installation according to claim 1, characterized in that the first and third laser sources and the second and fourth laser sources are placed mutually facing one another.

3. The installation according to claim 1, characterized in that the first and second laser sources are arranged to project onto the pile of postal articles a grid of 25×25 laser lines, and the third and fourth laser sources are arranged to project onto the pile of articles a grid of 63×63 laser lines.

4. The installation according to claim 1, characterized in that the laser lines are directed towards the platform at angles of incidence varying from 7.2° to 33.8° in steps of 1.15° relative to the axis of the camera of the vision system.

5. A postal sorting machine, comprising an installation according to claim 1 upstream from a sorting bin conveyor in which the small packets or parcels are moved past sorting receptacles.

* * * * *